(12) United States Patent
DiFoggio

(10) Patent No.: US 9,207,355 B2
(45) Date of Patent: Dec. 8, 2015

(54) METHOD FOR PHYSICAL MODELING OF RESERVOIRS

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 779 days.

(21) Appl. No.: 13/434,171

(22) Filed: Mar. 29, 2012

(65) Prior Publication Data

US 2012/0303347 A1     Nov. 29, 2012

Related U.S. Application Data

(60) Provisional application No. 61/490,404, filed on May 26, 2011.

(51) Int. Cl.
| | |
|---|---|
| *G06G 7/48* | (2006.01) |
| *G01V 99/00* | (2009.01) |
| *B22F 3/00* | (2006.01) |
| B29C 67/00 | (2006.01) |
| G01V 1/34 | (2006.01) |

(52) U.S. Cl.
CPC ............... *G01V 99/00* (2013.01); *B22F 3/008* (2013.01); *B29C 67/0051* (2013.01); *B29C 67/0092* (2013.01); *G01V 1/34* (2013.01)

(58) Field of Classification Search
CPC ............ B22F 3/008; G01V 1/34; G06T 19/00
USPC .......................................................... 703/10
See application file for complete search history.

(56) References Cited

U.S. PATENT DOCUMENTS

| | | | |
|---|---|---|---|
| 6,165,406 A | * | 12/2000 | Jang et al. ..................... 264/308 |
| 6,610,429 B2 | | 8/2003 | Bredt et al. |
| 6,989,115 B2 | | 1/2006 | Russell et al. |
| 7,037,382 B2 | | 5/2006 | Davidson et al. |
| 7,087,109 B2 | | 8/2006 | Bredt et al. |
| 7,109,717 B2 | * | 9/2006 | Constable ..................... 324/337 |
| 7,216,003 B2 | | 5/2007 | Faulkner et al. |
| 7,250,768 B2 | | 7/2007 | Ritter et al. |

(Continued)

FOREIGN PATENT DOCUMENTS

| | | |
|---|---|---|
| WO | 9836292 A2 | 8/1998 |
| WO | 2007126481 | 11/2007 |
| WO | 2009076066 A2 | 6/2009 |

OTHER PUBLICATIONS

Wieneke-Toutaoui, Burghilde M., and Hans W. Gerber. "Rapid Prototyping Technology—New potentials for offshore and abyssal engineering." Proc. 13th ISOPE, Honolulu 1 (2003): 27-32.*

(Continued)

*Primary Examiner* — Aniss Chad
(74) *Attorney, Agent, or Firm* — Cantor Colburn LLP

(57) ABSTRACT

Disclosed is method for simulating materials subsurface to the earth. The method includes: receiving dimensions of each subsurface material to be simulated; receiving a value of a property for each of subsurface materials to be simulated; and constructing a three-dimensional physical model of the subsurface materials using a three-dimensional printer, the three-dimensional printer being configured to print one or more layers of a print material for each of the subsurface materials being represented in the model wherein dimensions and a property value of the print material for each subsurface material being represented corresponds to the dimensions and the property value for that subsurface material.

23 Claims, 4 Drawing Sheets

(56) References Cited

U.S. PATENT DOCUMENTS

| | | | |
|---|---|---|---|
| 7,386,402 B2 | 6/2008 | Bryant | |
| 7,435,368 B2 * | 10/2008 | Davidson et al. | 264/113 |
| 7,620,534 B2 * | 11/2009 | Pita et al. | 703/10 |
| 7,778,780 B2 | 8/2010 | Kimminau et al. | |
| 7,788,049 B2 | 8/2010 | Bryant et al. | |
| 7,813,883 B2 | 10/2010 | Bryant | |
| 7,832,457 B2 | 11/2010 | Calnan et al. | |
| 7,993,123 B2 * | 8/2011 | Wigand et al. | 425/144 |
| 8,140,310 B2 * | 3/2012 | Fitzpatrick et al. | 703/10 |
| 2005/0165555 A1 | 7/2005 | Jackson | |
| 2009/0043507 A1 * | 2/2009 | Dommisse et al. | 702/6 |
| 2010/0082142 A1 | 4/2010 | Usadi et al. | |
| 2010/0102476 A1 | 4/2010 | Higgins | |
| 2010/0206559 A1 | 8/2010 | Sequeira, Jr. et al. | |
| 2013/0180327 A1 * | 7/2013 | Frederick | 73/152.01 |
| 2013/0345985 A1 * | 12/2013 | Priezzhev et al. | 702/14 |

OTHER PUBLICATIONS

Umur Caglar, Studies of Inkjet Printing Technology with Focus on Electronic Materials, Jan. 8, 2010, pp. 1-81, Tampere University of Technology.

Dragoman et al. Writing Electronic Devices on Paper With Carbon Nanotube Ink, Jan. 4, 2009, pp. 1-15, Bucharest, Romania.

Eduardo Gracia-Espino,Electrical Transport and Field-Effect Transistors Using Inkjet-Printed SWCNT Films Having Different Functional Side Groups, ACS Nano, May 19, 2010, pp. 3318-3324, American Chemical Society.

F. Zeng et al. Post-Cold Production Solvent Vapor Extraction (SVX) Process Performance Evaluation by Numerical Simulation, Saskatchewan Research Council, Jun. 17-19, 2008, Calgary, Alberta, Canada. pp. 1-14.

RPWorld.net, 3DP(Three Dimensional Printing), [retrieved on Jul. 17, 2012]. Retrieved from the internet:,URL:http://www.rpworld.net/cms/index.php/additive-manufacturing/rp-rapid-prototyping/3dp-t . . . (2 pages).

The Economist, 3D Printing, The printed world, Three-dimensional printing from digital designs will transform manufacturing and allow more people to start making things, Feb. 2011 [retrieved on Jul. 17, 2012]. Retrieved from the internet:,URL:http://jwww.economist.com/node/18114221/print. (10 pages).

Notification of Transmittal of the International Search Report and the Written Opinion of the International Searching Authority, or the Declaration; PCT/US2012/039616; Dec. 26, 2012.

* cited by examiner dimensional physical model 10 of materials disposed subsurface to the earth for the purpose of a logging tool tester. The model 10 represents the electrical or acoustic properties and configuration of the subsurface materials and can thus be used for analog simulation of the electrical or acoustic properties of those materials. In one or more embodiments, an electrical property of interest is resistivity or its inverse, conductivity.

METHOD FOR PHYSICAL MODELING OF RESERVOIRS

BACKGROUND

Boreholes are drilled deep into the earth for many applications such as carbon sequestration, geothermal production, and hydrocarbon exploration and production. Accurate knowledge of various subsurface materials is vital in order to make efficient use of drilling resources and to make best use of the subsurface environment.

Many different types of tools and instruments may be disposed in the boreholes to perform measurements to characterize the various subsurface materials. One type of tool is referred to as a resistivity logging tool. The resistivity logging tool performs electrical resistivity measurements of the subsurface materials as the tool is conveyed through a borehole penetrating those materials. Once the resistivity data is obtained as a function of depth, the data is "inverted" to estimate the physical and electrical properties of the materials from which one would obtain such measurement data. Hence, it is important that both the tool and the inversion model are calibrated in order to provide an accurate characterization of the subsurface material. It would be well received in the drilling industry if accurate and low cost methods for calibrating logging tools and inversion models could be developed.

BRIEF SUMMARY

Disclosed is method for simulating materials subsurface to the earth. The method includes: receiving dimensions of each subsurface material to be simulated; receiving a value of a property for each of subsurface materials to be simulated; and constructing a three-dimensional physical model of the subsurface materials using a three-dimensional printer, the three-dimensional printer being configured to print one or more layers of a print material for each of the subsurface materials being represented in the model wherein dimensions and a property value of the print material for each subsurface material being represented corresponds to the dimensions and the property value for that subsurface material.

Also disclosed is an apparatus for simulating materials subsurface to the earth. The apparatus includes a processor configured to receive dimensions and a value of a property for each subsurface material to be simulated. The apparatus further includes a three-dimensional printer coupled to the processor and configured to construct a three-dimensional physical model of the subsurface materials by printing one or more layers of a print material for each of the subsurface materials being represented in the model wherein dimensions and a property value of the print material for each subsurface material being represented correspond to the dimensions and the property value for that subsurface material.

Further disclosed is a computer readable medium having computer executable instructions for simulating materials subsurface to the earth by implementing a method that includes: receiving dimensions of each subsurface material to be simulated; receiving a value of a property for each of subsurface materials to be simulated; and sending instructions to a three-dimensional printer to construct a three-dimensional physical model of the subsurface materials by printing one or more layers of a print material for each of the subsurface materials being represented in the model wherein dimensions and a property value of the print material for each subsurface material being represented correspond to the dimensions and the property value for that subsurface material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
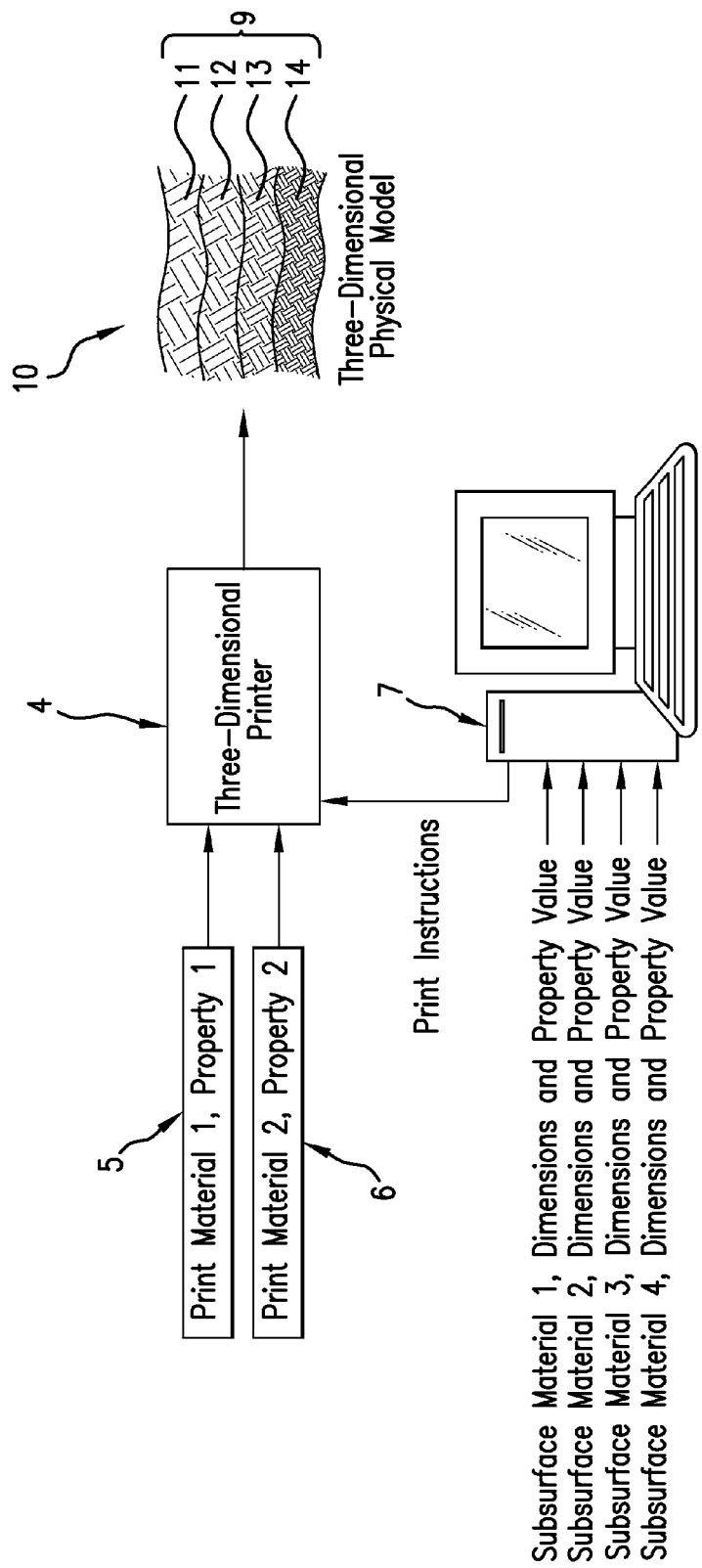
FIG. 1 illustrates an exemplary embodiment of an apparatus for simulating subsurface materials.

FIG. 1 illustrates an exemplary embodiment of a three-dimensional physical model 10 of materials disposed subsurface to the earth for the purpose of a logging tool tester. The model 10 represents the electrical or acoustic properties and configuration of the subsurface materials and can thus be used for analog simulation of the electrical or acoustic properties of those materials. In one or more embodiments, an electrical property of interest is resistivity or its inverse, conductivity.

The term "subsurface materials" relates to materials of interest beneath the surface of the earth. The subsurface materials can include materials making up a geologic formation or rock formation and the fluids (e.g., oil, gas or water) within their pores. The term "subsurface material representation" relates to a material having the same or similar characteristics, for one or more properties, to the subsurface material that the subsurface material representation represents in the model 10.

Still referring to FIG. 1, subsurface material representations 9 include a first subsurface material representation 11 having a first resistivity value $R_{11}$, a second subsurface material representation 12 having a second resistivity value $R_{12}$, a third subsurface material representation 13 having a third resistivity value $R_{13}$, and a fourth subsurface material representation 14 having a fourth resistivity value $R_{14}$. These subsurface material representations represent formation layers. It can be appreciated that the model 10 can include more than four different types of subsurface material representations and that the model 10 can model subsurface materials having various geometric shapes.

Still referring to FIG. 1, a three-dimension printer 4 is used to print one or more layers of a print material to construct the model 10 where one or more layers of the print material may be used to construct each subsurface material representation. The print material used to construct each subsurface material representation has an electrical property substantially the same as the electrical property of the subsurface material that the subsurface material representation represents. In the embodiment of FIG. 1, the printer 4 uses a first print material 5 having a first resistivity value and a second print material 6 having a second resistivity value. The printer 4 is configured to combine the first print material 5 and the second print material 6 to produce the subsurface material representations 11-14 having resistivities $R_{11}$-$R_{14}$, respectively, as long as $R_{11}$-$R_{14}$ fall within the range between the first resistivity and the second resistivity of the print materials. Hence, the printer 4 can be used to construct the model 10 with user-selected resistivity at each three-dimensional point, (x,y,z), in the model 10 within the resolution of the printer 4.

Still referring to FIG. 1, a processor 7 such as in a computer processing system is coupled to the printer 4. The processor 7 is configured to receive dimensions of the subsurface materials to be simulated by the model 10 and an electrical property for those materials. The processor 7 then sends printing instructions to the printer 4 to construct the model 10.

The three-dimensional printer 4 can be based on several technologies and may be of a type used for modern rapid prototyping. In one or more embodiments, the printer 4 is an ink-jet printer. The three-dimensional ink-jet printer uses inks of various resistances such as conductive inks and dielectric inks or some combination thereof to achieve a desired resistance. In one or more embodiments, the inks include carbon nanotubes such as single wall carbon nanotubes, which are known to make two-dimensional variable conductivity circuits, to achieve the desired resistance.

Other non-limiting embodiments of technologies used by the printer 4 include depositing filaments of molten plastic having resistive properties and depositing powder having resistive properties where one or more portions of the powder are then solidified with a binder or by sintering. Any binder or adhesive used to bind the print material must have conductive properties in order not to insulate the deposited grains of print material from each other.

Figure 2:
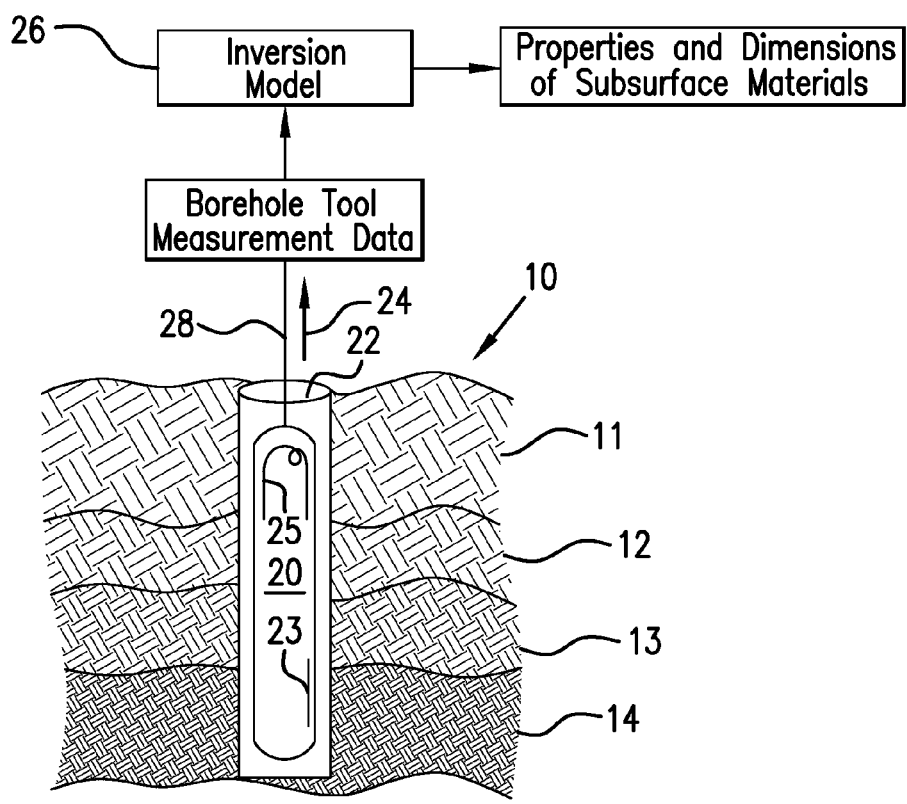
FIG. 2 illustrates an exemplary embodiment of a borehole tool disposed in a borehole that penetrates a three-dimensional physical model of the subsurface materials.

Reference may now be had to FIG. 2, which illustrates a cross-sectional view of a borehole 22 penetrating the subsurface material representations in the model 10. In one or more embodiments, dimensions of the borehole 22 are such as to allow a logging tool 20 to be disposed therein. The logging tool 20 may be disposed in the borehole 22 to test the tool 20's resolution for calibration or for validation or calibration of an inversion model 26 or algorithm using measurement data 24 received from the logging tool 20. The inversion model 26 receives measurement data from the logging tool 20 and estimates the properties and dimensions of the various subsurface materials, which when measurements are performed thereon would result in that measurement data. In one or more embodiments, the logging tool 20 can be a galvanic resistivity logging tool having an electrode 23 to inject and receive electrical current into an earth formation or an induction resistivity logging tool having an antenna 25 (which can be a coil) to transmit electromagnetic energy into and receive electromagnetic energy from the earth formation. Hence, a resistivity logging tool can be calibrated by being disposed in the model 10 where the model 10 has a known arrangement of subsurface material representations each having a known resistivity and performing measurements of the subsurface material representations. Similarly, by performing measurements with the logging tool 20 in the model 10 and inputting that data into the inversion model 26, the inversion model 26 can be validated or calibrated to provide as output the known arrangement of the subsurface material representations used in the model 10.

It can be appreciated that an outer boundary for the model 10 can be such that it only has to exceed a depth of investigation of the logging tool 10 disposed in the borehole 22. Hence, in one or more embodiments, the model 10 can assume a thick-walled hollow cylindrical or tube configuration to represent the region of a formation beyond a borehole that will be investigated.

Figure 3:
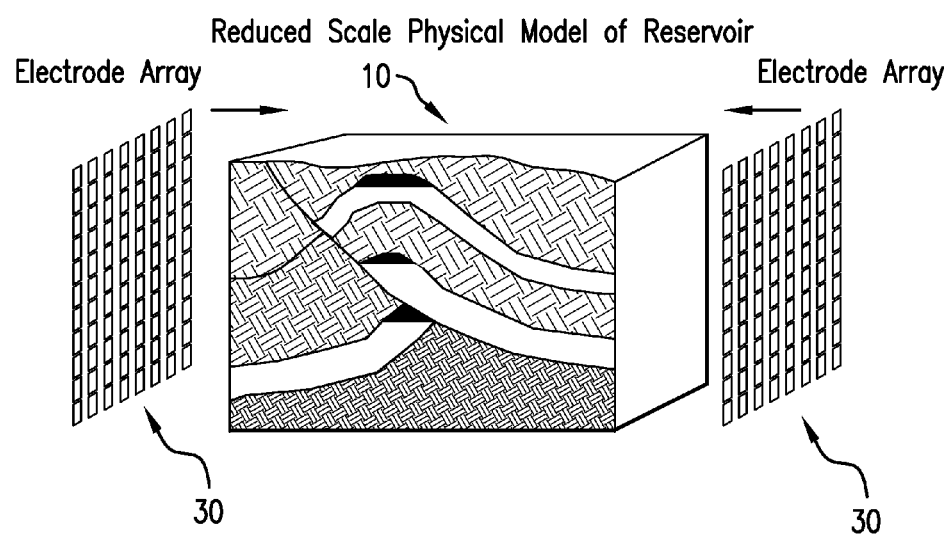
FIG. 3 illustrates a very reduced-scale physical model of a reservoir with electrode arrays that are brought into contact with the left and right faces of this model.

It can be appreciated that the model 10 can be made to represent an entire reservoir for large-scale simulation. In one or more embodiments, the model 10 can be used directly for resistivity simulations. In one or more embodiments, the model 10 can be used for permeability simulations. Permeability simulations can be performed because permeability is analogous to resistivity. As illustrated in FIG. 3, when permeability of the reservoir is known everywhere, it can be simulated with a reduced scale physical model for which voltage as a driving force is used to simulate pressure drop while the resulting current flow is used to simulate fluid flow under the assumption of uniform fluid viscosity throughout the reservoir. Hence, an entire reservoir's flow properties can be modeled using this physical electrical conductivity model to represent permeability in the model 10. If the fluid viscosity is not constant throughout the reservoir, but is known everywhere, then flow can be simulated in terms of mobility (permeability per unit viscosity) using such a physical model. In one or more embodiments, a two-dimensional array of electrodes 30 can be placed on opposite faces of the model 10 to simulate how fluid flow will occur in the model 10. That is, voltages representing pressures can be set at each electrode and then the current flows through each electrode representing fluid flows can be monitored. Whereas reservoir simulation is currently done primarily by digital computers and the computations can take many hours or days, the physical model 10 of a reservoir can serve as an analog computer for performing instantaneous reservoir simulation. If the scale of the model is considered too coarse, the model output can then be used as the starting point for a more refined digital computer simulation.

It can be appreciated that the model 10 can be constructed as a full-scale model or it can be constructed as a scaled down version of the subsurface materials being represented. When the model 10 is scaled down, the property values may also be scaled accordingly.

It can be appreciated that the model 10 can be constructed to model acoustic impedance of the subsurface materials. In one or more embodiments, two or more streams of print materials having different mass densities and/or stiffness are input into the printer 34 and used to construct the model 10 to simulate varying acoustic impedance of a reservoir. An acoustic transmitter transducer in acoustic communication with the model 10 can adjust an acoustic wavelength (by adjusting the acoustic frequency) to the scale of this reservoir model. Then, an acoustic receiver transducer in acoustic communication with the model 10 can receive resulting acoustic reflections to model seismic reflections by layers of subsurface materials to help with seismic migrations and other seismic calculations.

It can be appreciated that the logging tool 20 can be configured to be conveyed through a borehole in an earth formation by a carrier 28 as shown in FIG. 2. The carrier 28 is a wireline in the embodiment of FIG. 2. The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Figure 4:
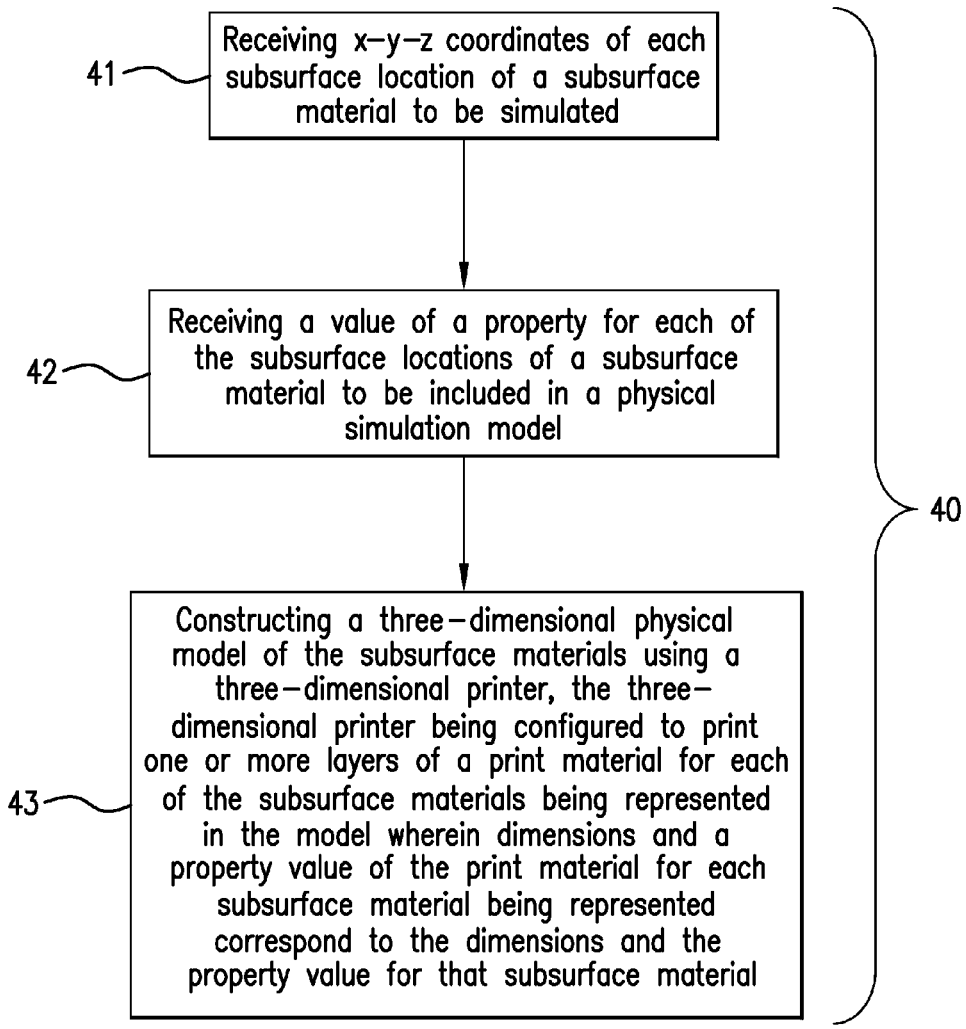
FIG. 4 presents one example of method for simulating subsurface materials.

FIG. 4 presents one example of a method 40 for simulating materials subsurface to the earth. The method 40 calls for (step 41) receiving dimensions of each subsurface material to be simulated. The dimensions can be represented by a three-dimensional coordinate system such as x,y,z coordinates. Further, the method 40 calls for (step 42) receiving a value of a property for each of subsurface materials to be simulated. Each received property value is assigned to one or more coordinates of the subsurface material being represented. The property can be resistivity, acoustic impedance, or other. Further, the method 40 calls for (step 43) constructing a three-dimensional physical model of the subsurface materials using a three-dimensional printer, the three-dimensional printer being configured to print one or more layers of a print material for each of the subsurface materials being represented in the model wherein dimensions and a property value of the print material for each subsurface material being represented correspond to the dimensions and the property value for that subsurface material. That is, the printer prints the print material that corresponds to the property value for each x,y,z coordinate of the model at or within the resolution of the printer. Step 43 can also include drilling a borehole in the model to simulate a borehole drilled through materials subsurface to the earth. Alternatively, the model can be constructed with the borehole being included.

In summary, a three-dimensional printer that is capable of mixing two or more input streams of materials having different material properties (e.g., resistivity or acoustic impedance) is used to print, point-by-point in three-dimensional space, a particular resistivity or acoustic impedance that is intermediate between the corresponding property limits of the input streams. Specifically, a modern multi-color rapid prototyping machine, which uses more than one input stream, is used to create physical scale models of reservoirs. These physical models can then be used as analog (rather than digital) reservoir simulators and they can also be used to make near-wellbore reservoir mock-ups to serve as logging tool response and interpretation testers. That is, the physical model of the reservoir can be made to represent an entire reservoir on a much reduced scale or it can be made in the form of a thick-walled hollow tube to represent, on a one-to-one, or nearly one-to-one, scale the near-wellbore region of a wellbore. This region of the wellbore will be investigated by a logging tool so as to physically test the logging tool's resolution in simulated layers of rock and to test various inversion models for the tool's data interpretation.

In support of the teachings herein, various analysis components may be used, including a digital and/or an analog system. For example, the processor 7, the three-dimensional printer 4, or the logging tool 20 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a magnet, electromagnet, sensor, electrode, transmitter, receiver, transceiver, antenna, transducer, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for simulating materials subsurface to the earth, the method comprising:
   receiving dimensions of each subsurface material to be simulated using a processor;
   receiving a value of a property comprising electrical resistivity for each of the subsurface materials to be simulated using the processor; and
   constructing a three-dimensional physical model of the subsurface materials using a three-dimensional printer, the three-dimensional printer being configured to print one or more layers of a print material for each of the subsurface materials being represented in the model wherein dimensions and a property value of the print material for each subsurface material being represented correspond to the dimensions and the electrical resistivity value for that subsurface material;
   estimating a property of the materials subsurface to the earth by applying an electrical stimulus to the physical model and receiving an electrical signal in response to the electrical stimulus;
   wherein the electrical stimulus is a voltage or current applied using one or more electrodes and the received electrical signal is a voltage or current received using one or more electrodes.

2. The method according to claim 1, wherein the subsurface materials comprise a reservoir.

3. The method according to claim 1, wherein the electrical stimulus is first electromagnetic energy transmitted using an antenna and the received electrical signal is second electromagnetic energy received using an antenna.

4. The method according to claim 1, wherein the property is a reservoir property comprising conductivity, permeability, or flow rate of the reservoir.

5. The method according to claim 4, wherein the conductivity or permeability is estimated from a measured impedance of the physical model.

6. The method according to claim 1, wherein a borehole traverses the physical model.

7. The method according to claim 6, wherein an outer boundary of the physical model exceeds a depth of investigation of a logging tool disposed in the borehole.

8. The method according to claim 6, further comprising:
placing a logging tool in the borehole of the physical model;
applying an electrical stimulus to the physical model using the logging tool;
receiving an electrical signal in response to the applied electrical signal; and
calibrating the logging tool using the received electrical signal.

9. The method according to claim 6, further comprising:
placing a logging tool in the borehole of the physical model;
applying an electrical stimulus to the physical model using the logging tool;
receiving an electrical signal using the logging tool in response to the applied electrical signal; and
validating or calibrating a mathematical inversion model configured to estimate one or more characteristics of the subsurface materials that would provide the electrical signal received by the logging tool.

10. The method according to claim 9, wherein the one or more characteristics comprise one or more dimensions, conductivity, permeability, or some combination thereof.

11. The method according to claim 1, wherein the physical model is a full-scale model of at least a portion of the subsurface materials.

12. The method according to claim 1, wherein the physical model is a scaled-down model of at least a portion of the subsurface materials.

13. The method according to claim 1, where the property further comprises acoustic impedance.

14. The method according to claim 1, wherein the print material comprises a first print material having a first property value and a second print material having a second property value.

15. The method according to claim 14, wherein the first property value comprises a first resistivity value and the second property value comprises a second resistivity value.

16. An apparatus for simulating materials subsurface to the earth, the apparatus comprising:
a processor configured to receive dimensions and a value of a property comprising electrical resistivity for each subsurface material to be simulated;
a three-dimensional printer coupled to the processor and configured to construct a three-dimensional physical model of the subsurface materials by printing one or more layers of a print material for each of the subsurface materials being represented in the model wherein dimensions and a property value of the print material for each subsurface material being represented correspond to the dimensions and the electrical resistivity value for that subsurface material;
one or more electrodes disposed on the physical model and for (i) applying an electrical stimulus to the physical model and (ii) receiving an electrical signal in response to the electrical stimulus, wherein the electrical stimulus is a voltage or current and the received electrical signal is a voltage or current; and
a processor for estimating a property of the materials subsurface to the earth using the electrical stimulus and the electrical signal.

17. The apparatus according to claim 16, wherein the print material comprises a first print material having a first resistivity value and a second print material having a second resistivity value and wherein the electrical resistivity values of the subsurface materials are within a range of resistivity values between the first resistivity value and the second resistivity value.

18. The apparatus according to claim 16, wherein the print material comprises carbon nanotubes.

19. The apparatus according to claim 16, wherein the property further comprises acoustic impedance.

20. The apparatus according to claim 16, wherein the one or more electrodes comprises an array of electrodes configured to apply a voltage to the three-dimensional physical model and to measure a resulting current in order to simulate a fluid flow in the subsurface materials.

21. The apparatus according to claim 16, wherein the print material comprises a first print material having a first property value and a second print material having a second property value.

22. The apparatus according to claim 21, wherein the first property value comprises a first resistivity value and the second property value comprises a second resistivity value.

23. A non-transitory computer readable medium comprising computer executable instructions for simulating materials subsurface to the earth by implementing a method comprising:
receiving dimensions of each subsurface material to be simulated;
receiving a value of a property comprising electrical resistivity for each of subsurface materials to be simulated; and
sending instructions to a three-dimensional printer to construct a three-dimensional physical model of the subsurface materials by printing one or more layers of a print material for each of the subsurface materials being represented in the model wherein dimensions and a property value of the print material for each subsurface material being represented correspond to the dimensions and the electrical resistivity value for that subsurface material;
estimating a property of the materials subsurface to the earth by applying an electrical stimulus to the physical model and receiving an electrical signal in response to the electrical stimulus;
wherein the electrical stimulus is a voltage or current applied using one or more electrodes and the received electrical signal is a voltage or current received using one or more electrodes.

* * * * *